Sept. 26, 1967 G. L. COUCH 3,343,340
METERING DEVICE FOR CONTROLLING LOW RATES OF FLOW BETWEEN
REGIONS OF WIDELY-DIFFERENT PRESSURES
Filed Dec. 28, 1964

INVENTOR:
GEORGE L. COUCH,
BY William Freedman
ATTORNEY

United States Patent Office 3,343,340
Patented Sept. 26, 1967

3,343,340
METERING DEVICE FOR CONTROLLING LOW RATES OF FLOW BETWEEN REGIONS OF WIDELY-DIFFERENT PRESSURES
George L. Couch, Media, Pa., assignor to General Electric Company, a corporation of New York
Filed Dec. 28, 1964, Ser. No. 421,284
3 Claims. (Cl. 55—189)

This invention relates to a metering device for precisely controlling the flow of small quantities of gas from a region of very high pressure to a region of low pressure.

The metering device typically used for such applications is a fixed-diameter orifice or a needle valve. Where the flow through the metering device must be kept low and the pressure drop across the metering device is very high, the flow passage through the orifice or the needle valve must be extremely small. Such small passages are susceptible to being clogged by foreign particles, and such clogging can adversely affect, or even prevent, flow therethrough.

An object of my invention is to provide a metering device which can be relied upon to precisely control low rates of flow between regions of widely different pressure and which is not susceptible to such clogging.

In carrying out the invention in one form, I provide a long metallic tube of generally helical form defining a capillary passage extending between opposite ends of the tube. Joined in pressure-tight relationship to the respective opposite ends of the tube are a pair of fittings, each having an opening extending therethrough and communicating with the capillary passage. In each of the fittings there is a porous metal filter arranged in the path of any gas flowing through the capillary passage. Surrounding the metallic tube and joined at its opposite ends to the fittings is a tubular housing that is provided with means affording free communication between its exterior and interior to prevent any substantial pressure build-ups in its interior.

Figure 1:
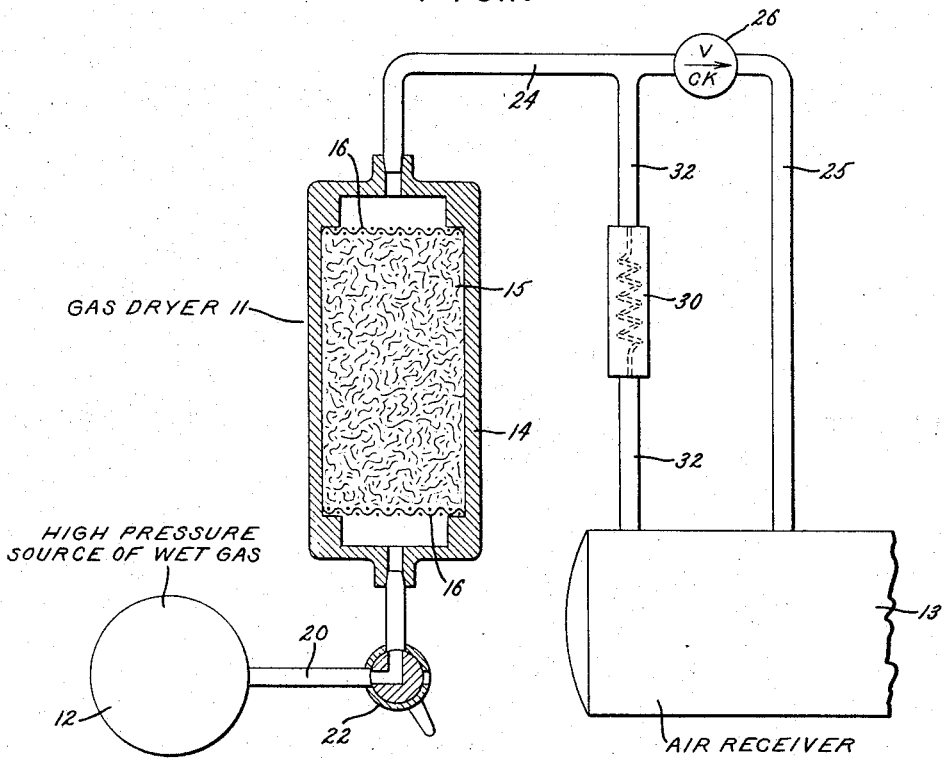
Figure 2:
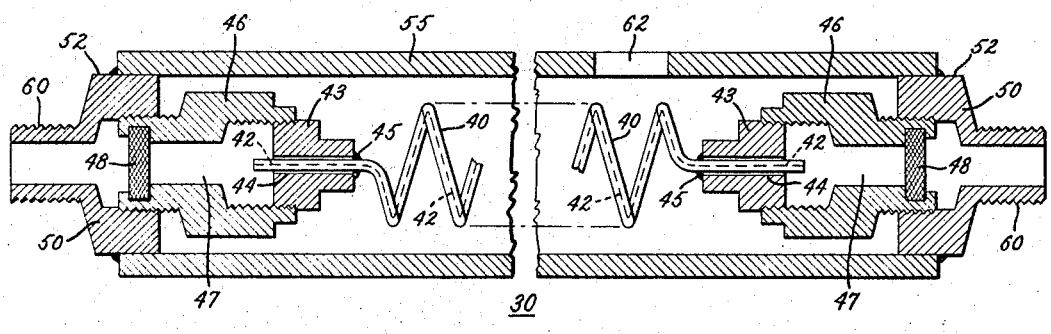

For a better understanding of my invention, reference may be had to the following description taken in connection with the accompanying drawing, wherein:

FIG. 1 is a schematic illustration of a gas drying system embodying one form of my invention, and FIG. 2 is an enlarged sectional view of a portion of FIG. 1.

Referring now to FIG. 1, there is shown a desiccant-type dryer 11 interposed between a high pressure source 12 of wet gas and a high pressure gas receiver 13. The dryer comprises a pressure vessel 14 containing a desiccant 15, such as silica gel. The dessicant 15 is held in place within the vessel 14 by suitable screens 16 provided at the top and bottom of the desiccant. High pressure gas can flow from the source 12 to the dryer through a line 20 containing a control valve 22. As this gas flows upwardly through the dryer, it transfers its moisture to the desiccant 15. Thereafter, the dry gas flows from the dryer 11 to the gas receiver 13 via a high pressure line 24, 25. A check valve 26 in the portion 25 of this high pressure line prevents any back flow of gas through this line portion 25.

In parallel-circuit relationship with the check valve 26 is a metering device 30 embodying the present invention. This meeting device, which is connected in a line 32, presents a high resistance to flow therethrough and, thus, no significant amount of gas flows through it into the gas receiver 13.

After a prolonged period of duty, the desiccant 15 will have absorbed a considerable quantity of moisture and must be reactivated in order that its original moisture-absorbing properties be restored. This reactivation is accomplished by operating valve 22 to a position where it vents the bottom of the dryer 11 to atmosphere but blocks flow through the line 20. Venting the bottom of the dryer 11 in this manner permits high pressure dry gas to flow from the gas receiver 13 into the dryer 11 via a path that extends through lines 32 and 24. The reactivating gas passes downwardly through the desiccant 15, extracting moisture therefrom and exhausting through the valve 22, which is then in its venting position.

In order to conserve the dry air in receiver 13 and for various other reasons which need not be explained, it is desirable to limit the flow of reactivating gas through the desiccant to a very low rate. This low rate of flow is obtained by blocking reverse flow through the normally-unrestricted line 25 by means of the check valve 26 and by thus forcing all of the reactivating gas to find a path through the metering device 30. Since the metering device 30 presents a high resistance to flow, it limits the flow rate to the desired low value.

It has been proposed to use a fixed orifice or a needle valve in the line 32 to limit the flow rate of the reactivating gas. Such metering devices may be satisfactory for applications where the pressure drop across the metering device is relatively low; but in the illustrated application, very high pressure drops, e.g., 2000 p.s.i., are developed across the metering device. With such high pressure drops, the flow passage through an orifice or a needle valve would have to be extremely small in order to limit the flow rate to the desired low level.

Such extremely small flow passages are disadvantageous because they are highly susceptible to clogging. For example, it is possible for the high pressure air passing through the desiccant 15 during a normal drying operation to carry minute particles of desiccant into the line 24. Such particles could cause clogging of these extremely small flow passages. Such clogging could decrease, or even block, the desired flow through the metering device during reactivation.

I have provided a metering device 30 which has an exceptional resistance to any such clogging. This metering device 30 is shown in detail in FIG. 2. It comprises a long metallic tube 40 that has a capillary passage 42 extending between opposite ends of the tube. Assuming a given flow rate, this capillary passage 42 can be made much larger in transverse cross-section than the flow passage through an orifice or a needle valve because it is vastly longer than the flow passage through an orifice or needle valve. This much greater length permits the same flow resistance to be obtained despite the much larger cross-section of the capillary passage.

To obtain the desired length of capillary passage in a metering device of reasonable length, the capillary tube 40 is wound into a helical coil, in which form it is shown in FIG. 2. Attached to each end of the tube 40 is a pipe plug 43 having a bore 44 that receives the end of the tube 40. A suitable brazed joint 45 is provided between the exterior of the tube 40 and the bore of the pipe plug to provide a pressure-tight joint between these parts.

The pipe plug 43 has an externally threaded cylindrical portion that receives an internally threaded tubular fitting 46. This fitting 46 has a large opening 47 extending therethrough. Disposed within this opening 47 is a porous metal disc 48 which serves as a filter. The pores in the porous disc 48 are much smaller than the capillary passage 42, but there are so many of these pores that the disc 48 presents a negligible resistance to flow therethrough in comparison to the resistance presented by the capillary passage 42. Since the flow resistance of porous disc 48 is relatively low, there is little pressure differential thereacross and little tendency for it to be displaced from its position illustrated.

Each of the porous metal discs 48 will normally prevent any particles larger than several microns in diameter from passing therethrough. Thus, these filtering discs 48 in combination with the relatively large diameter of the capillary passage 42 provide an exceptional resistance to the assembly's becoming clogged by foreign particles. The relatively large space at each surface of each filtering disc 48 provides further assurance that flow through the filtering discs will not be blocked by particles of foreign matter collecting at this point.

Secured to the outer end of fitting 46 is an adapter 50, which has an internally threaded portion receiving an externally threaded portion of the fitting 46. The adapter 50 has a cylindrical outer portion 52.

Disposed about the outer portions 52 of the adapters 50 at the opposite ends of the assembly is a tubular metallic housing 55. This housing 55 is tack-welded at its opposite ends to the two fittings 50. The housing 55 surrounds the capillary tube 40 and protects it from damage against rough handling.

Another purpose of the housing 55 is to relieve the capillary tube 40 from stresses which might otherwise be imposed upon it by torque applied to an adapter 50 when the assembly is being installed in the line 32. In this latter connection, the adapters 50 have externally threaded portion 60 which receive suitable fittings (not shown) that are screwed thereon to connect the assemlb into line 32.

To prevent a pressure build-up internally of the housing 55 in the event of a leak developing in the metering device 30, the housing 55 is provided with an opening 62 that affords free communication between its interior and exterior.

The housing 55 is also relied upon to provide a definite and predetermined spacing between the adapters 50 to facilitate incorporation of the assembly in the line 32. From one assembly to another, differing lengths of capillary tubing 40 may be required to provide the desired rate of flow. But a wide variation in such length can be accommodated in a housing 55 of a given length simply by varying the number of turns in the helix of tube 40 or by varying the spacing between the turns of the helix. The capillary tube 40 is sufficiently flexible to permit these variations to be easily made.

As an example of the size capillary passage that I might be concerned with, a commercially-used metering device of my invention has an eight inch long capillary passage of .009 inch diameter. An orifice of equal flow resistance must typically have a diameter of less than one-half this value, or a cross-sectional area of less than one-fourth that of the capillary passage. The susceptibility of such a tiny orifice to clogging will be apparent.

While I have shown and described a particular embodiment of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. A metering device for precisely controlling small quantities of gas flowing from a region of very high pressure to a region of low pressure, comprising:
   (a) a long metallic tube of a generally helical form defining a generally helical capillary passage extending between opposite ends of said tube,
   (b) a pair of fittings respectively located at the opposite ends of said tube, means joining said fittings to said tube in pressure-tight relationship for substantially preventing leakage between said tube and said fittings,
   (c) each of said fittings having an opening extending therethrough and communicating with said capillary passage, said opening having a larger cross-section than that of said capillary passage,
   (d) a porous metal filter in the opening in each of said fittings arranged in the path of any gas flowing through said capillary passage and spaced from said capillary passage, said porous metal filter having pores much smaller in cross-section than the cross-section of said capillary passage,
   (e) a tubular housing joined at its respective opposite ends to said fittings and surrounding said metallic tube,
   (f) and pressure-relieving means affording free communication between the interior and exterior of said housing.

2. The metering device of claim 1 in which said filters impose a very small resistance to flow through said device in comparison to the resistance of said capillary passage, said filters each having a large exposed area at each side thereof in comparison to the cross-sectional area of said capillary passage.

3. In a gas drying system that comprises a desiccant-type dryer, a high pressure gas receiver, and means for delivering dry gas from said dryer to said gas receiver; means for returning a small quantity of said dry gas from said receiver to said dryer to reactivate said dryer, comprising:
   (a) a generally helical long metallic tube of a generally helical form defining a capillary passage extending between opposite ends of said tube and connecting said receiver to said dryer,
   (b) a pair of fittings respectively located at the opposite ends of said tube, means joining said fittings to said tube in pressure-tight relationship for substantially preventing leakage between said tube and said fittings,
   (c) each of said fittings having an opening extending therethrough and communicating with said capillary passage, said opening having a larger cross-section than that of said capillary passage,
   (d) a porous metal filter in the opening in each of said fittings arranged in the path of any gas flowing through said capillary passage and spaced from said capillary passage, said porous metal filter having pores much smaller in cross-section than the cross-section of said capillary passage,
   (e) a tubular housing joined at its respective opposite ends to said fittings and surrounding said metallic tube,
   (f) and pressure-relieving means affording free communication between the interior and exterior of said housing.

References Cited

UNITED STATES PATENTS

| 1,622,843 | 3/1927 | Price et al. | 138—42 |
| 1,904,615 | 4/1933 | Bristol et al. | 138—42 X |
| 1,933,348 | 10/1933 | Shanklin | 138—41 X |
| 1,938,475 | 12/1933 | Alexander | 138—44 |
| 2,225,513 | 12/1940 | Summers | 138—44 |
| 2,629,403 | 2/1953 | Allen | 138—44 |
| 2,805,685 | 9/1957 | Jopson | 138—42 |
| 3,147,095 | 9/1964 | Kanuch | 55—163 |
| 3,242,650 | 3/1966 | Crawford | 55—163 |

REUBEN FRIEDMAN, *Primary Examiner.*

J. ADEE, *Assistant Examiner.*